INVENTOR
S. F. Dunning
BY
[signature]
ATTORNEY

May 30, 1950 S. F. DUNNING 2,509,489

DEVICE FOR TIMING TELEPHONE CALLS

Original Filed April 21, 1945 3 Sheets-Sheet 2

INVENTOR
S. F. Dunning

BY

ATTORNEY

INVENTOR
S. F. Dunning
BY
H. A. Patterson
ATTORNEY

Patented May 30, 1950

2,509,489

UNITED STATES PATENT OFFICE 2,509,489

DEVICE FOR TIMING TELEPHONE CALLS

Sanford Frank Dunning, Glen Ellyn, Ill., assignor to American Telephone and Telegraph Company, a corporation of New York Original application April 21, 1945, Serial No. 589,606, now Patent No. 2,492,381, dated December 27, 1949. Divided and this application September 6, 1946, Serial No. 695,200

7 Claims. (Cl. 161—19)

This invention relates to timing devices and particularly to a method and means for timing the duration of a telephone call. This application is a division of my pending application Serial No. 589,606, filed April 21, 1945, now Patent No. 2,492,381 dated December 27, 1949.

The present invention resides in a timing device connected with a cord circuit in a telephone switchboard and under the control of the message register key, or other key whereby a signal will be given to the operator to indicate the termination of a pre-fixed interval of time during which a telephone conversation has been maintained over the lines connected to the said cord circuit.

Figure 1:
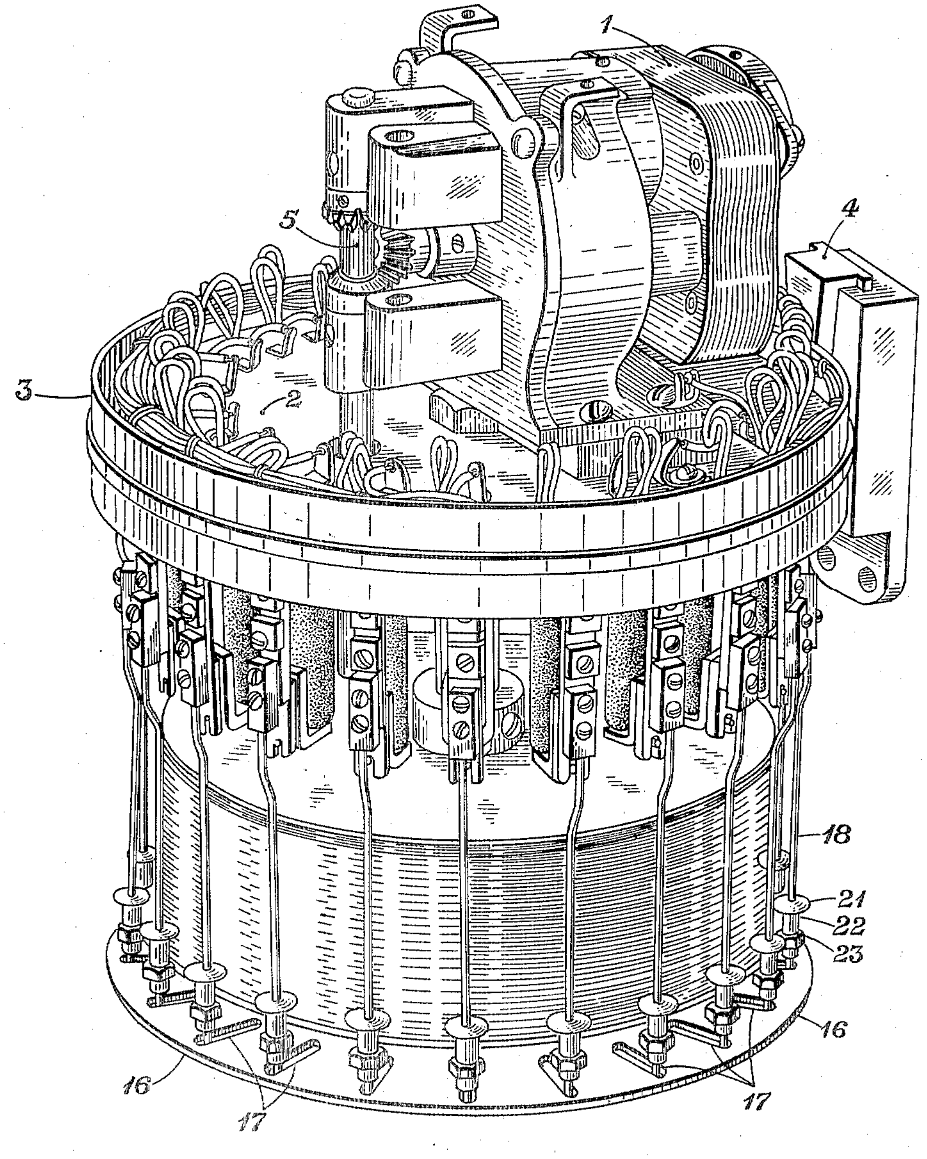
Figure 2:
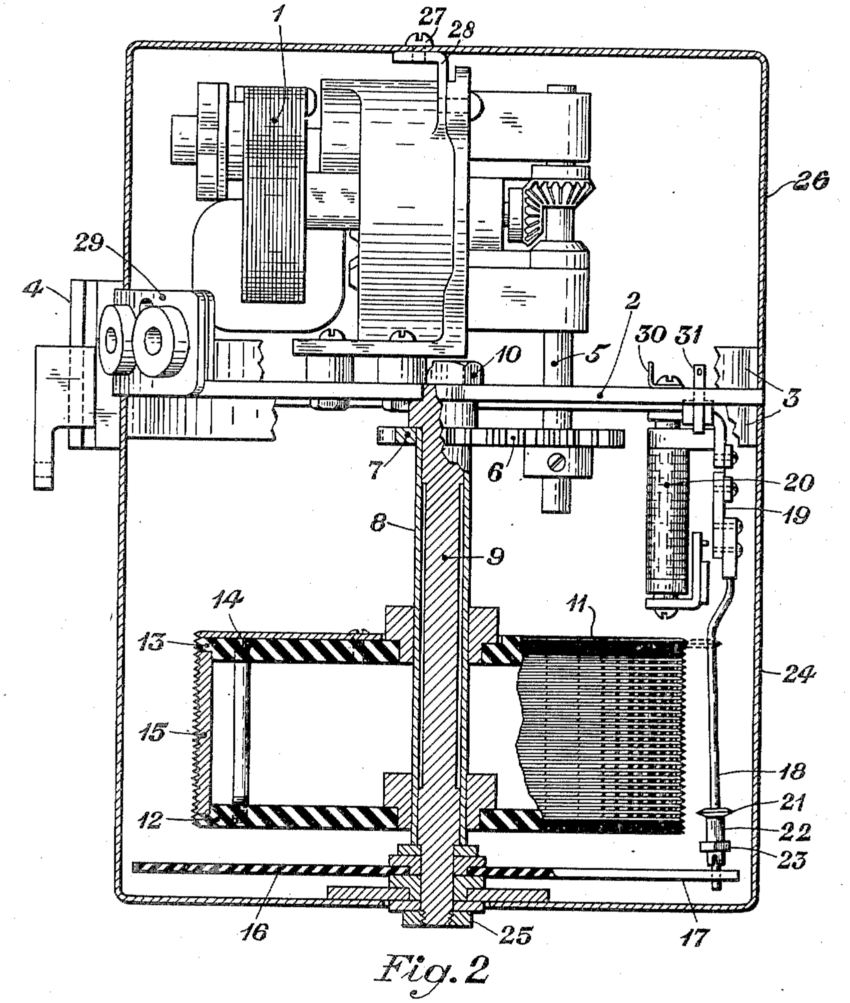
Figure 3:
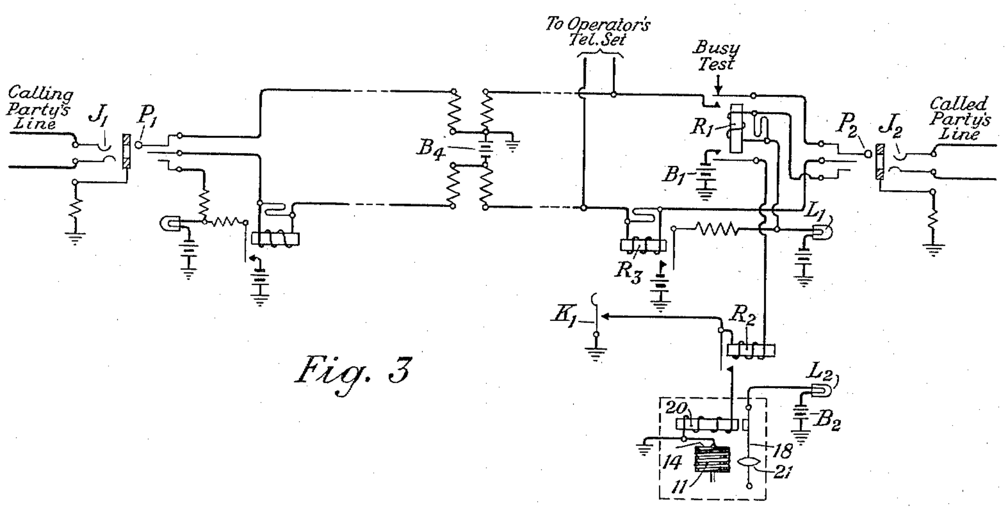
Figure 4:
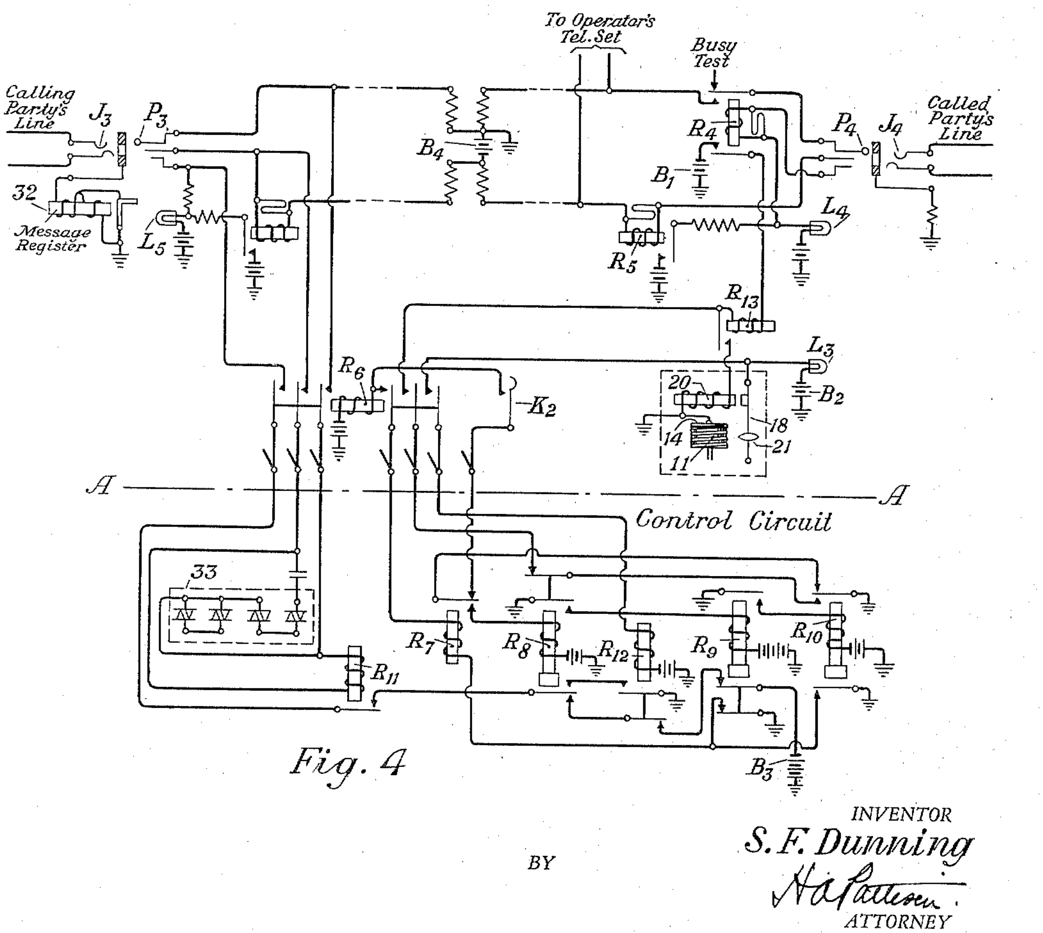

The form of the device in which this invention is embodied, and its mode of operation, will be clearly understood from the following description when read in connection with the attached drawing of which Figure 1 is a view in perspective of the timing device; Fig. 2 is a side view of the said device, with a portion shown as a cross-section; and Figs. 3 and 4 are schematic drawings of some of the cord circuits with which the said timing device may be employed.

The timing device, in which this invention resides, employs a rotating drum which has thereon a spiraled groove extending from one end of the drum to the other, the speed of rotation of the drum and the length of the groove being such that if a rider engages the groove at one end of the drum, it will be carried to the other end of the drum in a given interval of time. By the provision of suitable contacts a circuit through a signal device, such as a lamp, will be closed when the rider has traversed the length of the drum.

That device and its mode of operation will be clearly understood by referring to Figs. 1 and 2 in which the same reference numerals have been employed to indicate the same parts. At the top of the device there is represented an electric motor 1 which is suitably mounted upon a platform 2 fixedly connected to the ring 3 having a clamping means 4 by which the entire device may be supported from the inside of the top or the side of a switchboard section. The motor 1 is geared to the shaft 5 and at the lower end thereof is another gear 6 which meshes with a gear 7 that is fixedly connected to the shaft 8. The shaft 8, which is hollow, is supported by the bolt 9 which is rigidly attached to the platform at 10, and a drum 11 is attached to the shaft 8 so as to be rotated thereby. The drum, as there shown, is cylindrical in form and has a spiraled groove extending from one end to the other end thereof. The ends 12 and 13 of the cylinder, as shown in Fig. 2 are of insulating material, but the upper end 13 has thereon a plate 14 which is of electrically conducting material. The major portion of the side wall of the cylinder 15 may be of either metallic or non-metallic material. If metallic, as shown in the drawing, that section should be insulated from the plate 14 at the upper end of the drum for a purpose which will be later described.

The spiraled groove starts, as shown in the figures, at the lower end of the cylinder and extends up to and includes the plate 14 at the top. Beneath the drum, and supported by the bolt 9, is a guide plate 16 having therein a plurality of slots such as 17 of Fig. 1, the purpose of which is to guide the rods which support the riders that engage the groove of the drum. Each of those rods, such as 18, is attached to an armature such as 19 of a magnet 20. The rider 21, which is shown in the form of a disc, is rotatable and slidable upon the rod 18, and, when not in engagement with the groove of the drum, rests upon a collar 22 which is held in position by a nut 23 at the bottom of the rod. The normal position of the rod 18 is such as to hold the rider away from the side wall of the drum. Upon the attraction of the armature 19 by the energization of the magnet 20, the rod 18 will be moved toward the drum to such extent as to bring the rider into engagement with the groove upon the drum, the position of engagement thereon being determined by the adjustment of the nut 23. The rods 18 are designed to move in planes that extend substantially through the axis of the drum, and they are maintained in that position, that is, they are prevented from swaying laterally by the slots 17 in the guide plate 16. The rider 21, upon its engagement with the groove of the drum, will be caused to move upwardly upon the rod 18 and will continue thus to move until it reaches the plate 14 where the groove terminates.

When the rider comes to rest at the plate 14, which it will do in a pre-fixed length of time, it will cause the closing of a circuit containing a lamp or other signalling device which will indicate to an operator that a call has continued for that length of time. The manner in which that is accomplished will be presently described in connection with Figs. 3 and 4 which show the connection of the timing device with two different types of cord circuits. Before passing to the consideration of those figures, it is desired to point out that the apparatus just described is protected by a suitable cover. The lower portion of the cover, designated 24, when in position, fits over the lower portion of the ring 3 and is held thereon by means of a nut 25 which engages the bolt 9. The upper portion of the housing designated 26 fits over the upper portion of the ring 3 and is fastened by a screw 27 which engages a bracket 28. A terminal block 29 is provided for the terminals of the circuit of the motor 1. The platform 2 also carries a plurality of contacts such as 30 and 31, which are connected to the magnets such as 20 to provide means for connecting the timing device to the cord circuits of a position.

Having in mind the foregoing description of the timing device and of its mode of operation, the manner in which the device is employed by an operator will be described, first, in connection with a cord circuit employed in two-party ticketed operation, and then in connection with a cord circuit for message register operation.

In Fig. 3, $P_1$ and $P_2$ represent the answering and the calling plugs of the circuit. Upon receiving a call, the operator inserts the plug $P_1$ in the jack $J_1$ and answers in the usual manner. Thereupon, the plug $P_2$ will be inserted in the jack $J_2$ of the called party's line which will effect the operation of relay $R_1$ and the lamp $L_1$ will light. When the called party answers the telephone, relay $R_3$ will be operated and, thereupon the lamp $L_1$ will be extinguished. The operation of relay $R_1$ will apply the voltage of the battery $B_1$ to the relay $R_2$ which, however, will not be operated until the key $K_1$ is operated. Since the parties are then in conversation, the operator will operate the key $K_1$ which causes the operation of relay $R_2$ and that in turn will energize the magnet 20 of the timing device. The attraction of its armature will swing the rod 18 inwardly toward the drum 11 and thereby will bring the rider 21 into engagement with the groove of the drum. The rider will then travel upward on the rod 18 until it comes into engagement with the plate 14 upon the upper end of the drum. Thereupon a circuit will be established that extends from the battery $B_2$ to the grounded plate 14 and includes the lamp $L_2$, rod 18, and the rider 21. The lighting of the lamp indicates to the operator that the conversation has continued a given length of time, say five minutes. Thereupon the operator will again operate the key $K_1$ which reduces the current through the magnet 20 so as to cause the magnet to be de-energized and thereby to permit the rod 18 to move the rider 21 out of engagement with the groove of the drum. The rider will thereupon fall to the bottom of the rod and since the key $K_1$ is closed only momentarily, and is not now open, sufficient current will now flow through the magnet 20 to attract its armature and to bring the rider 21 again into engagement with the groove of the drum at the low point thereon. Thereafter the rider will continue to rise along the rod 18 and to function in the manner heretofore described. Upon completion of the call, which will be evident by the lighting of the lamp $L_1$ the operator will pull the plug $P_2$ from the jack $J_2$. That will release relays $R_1$ and $R_2$ which, in turn, will release the timing device and restore it to its initial position for subsequent use.

The manner in which the invention is employed in connection with a message registering circuit is shown in Fig. 4. Upon the receipt of a call, the plug $P_3$ in inserted in the jack $J_3$ which has a message register connected to the sleeve thereof. The operator will thereupon insert the plug $P_4$ in the jack $J_4$ of the called party's line thereby operating relay $R_4$ and lighting the lamp $L_4$. As soon as the party answers, relay $R_5$ will operate, thereby extinguishing the lamp. When the operator observes that the called party has answered, she will then momentarily depress the message register key $K_2$, the operation of which operates relay $R_6$ which in turn closes a path through its locking contact to operate relay $R_7$ which, together with all other relays and apparatus below the dotted line A—A is common to a plurality of cord circuits. Relay $R_7$ does not operate however until the key $K_2$ is released, since it is shunted by direct ground through the key. The operation of relay $R_7$ removes ground from the key armature for the purpose of preventing the operation of a second relay such as $R_6$ by the operation of another message register key. Relay $R_7$ also operates relays $R_8$ and $R_9$ and $R_{10}$ in turn. The operation of relay $R_{10}$ releases relay $R_8$ and in turn relays $R_9$ and $R_{10}$. The operation and release of the group of relays $R_8$ to $R_{10}$ provides 3 consecutive time intervals for unlocking the message register, operating the message register and releasing the common circuit which, as stated, is that shown below the line A—A.

When relay $R_6$ operated it connected relay $R_{11}$ across the tip and ring of the circuit. Relay $R_{11}$ is operated by current from the battery $B_4$ and ground, through the repeating coil. The operation of relay $R_6$ also extends the sleeve of the cord to the contacts of relays $R_8$ to $R_{10}$ which, it should be stated, are of slow-releasing type. When the operation of the circuit has progressed to the point where relay $R_8$ has released but relays $R_9$ and $R_{10}$ are still operated, voltage from the battery $B_3$ which is of the order of 39 volts, is connected to the sleeve of the answering plug to operate the message register 32. Relay $R_9$ has a minimum releasing period of 0.5 second to insure that the register will operate and lock. Also, during the releasing time of relay $R_9$ ground is connected to relay $R_{13}$ in the cord circuit which operates and locks to ground through the winding 20 of the magnet of the timing device. The latter operates when ground is removed from the make contact of relay $R_{10}$. When relay $R_9$ is normal, relay $R_{10}$ is in the process of releasing and the ground which holds relays $R_6$ and $R_7$ operated is removed and they accordingly release. Relay $R_{10}$ is slow releasing to insure that the latter relays will have adequate time to restore.

As has been described heretofore, when the magnet 20 of the timing device is energized the rider will be brought into engagement with the rotating drum and will continue to rise until it reaches the end of the groove in the metallic disc at the upper end of the drum which, for example, may occur at the end of the five minutes. Thereupon, the lamp $L_3$ lights. When the operator sees the lamp lighted, she will momentarily depress the key $K_2$ provided the supervisory lamps $L_4$ and $L_5$ are still dark. That operates relay $R_6$ and starts the control circuit functioning.

The control circuit, which as stated is that portion of the figure below the dotted line A—A, operates exactly as before, except that the relay $R_{12}$ is operated from the timer ground. The latter puts ground on the sleeve during the releasing time of the relay $R_8$. That unlocks the message register, by shunting its winding, and the same shunt releases the cut-off relay of the line circuit which, though not shown in the figure, is to be understood to be present in the circuit. That operation connects the ground and battery of the line relay to the tip and ring of the line which tends to produce an acoustic disturbance. In order to minimize such disturbance, the varistor network 33 is provided. If for any reason the contacts of relay $R_6$ fail to connect the varistors across the line, the winding of relay $R_{11}$ will also be open and will accordingly not be operated. Under that condition the shunting ground will be open and accordingly the unguarded disturbance will not be applied.

When relay $R_8$ is normal, ground is applied to the winding of relay $R_{13}$ in the cord circuit which holds the latter but releases the timing device by shunting the winding of the magnet 20. Accordingly, ground is immediately removed from the circuit in which the rider 21 of the timer is included and accordingly relay $R_{12}$ is released. As a result of that operation, the circuit from the battery $B_3$ to the winding of the message register is closed, which causes the operation of the message register and thereafter the operation proceeds as hereinbefore described. It is desirable to point out that upon the release of the timing device the rider 21 drops to the bottom of the rod 18 and, upon subsequent operation of the said device the rider was again brought into engagement with the drum 11, thus starting the timing of the next prefixed interval of time.

It is desirable to point out that each of the magnets 20 is individual to and connected with one of the cord circuits of an operating position so that by the provisions of the required number of magnets a single timing device will take care of the timing operations of all the cord circuits of an operating position of the switchboard. It will, of course, be obvious that various modifications may be made in the structure of this timing device without departing from the scope of the invention. For example, the drum 11, as shown in Figs. 1 and 2 could be made entirely of plastic or other insulating material except for a ring or a plate of electrically conducting material at the upper end thereof by which the circuit is closed when the rider reaches the upper end of the drum.

If it is desired to close the circuit of the indicating lamp at successive intervals of time, say at the end of five minutes and again at the end of ten minutes, such result could be accomplished by a drum having a plurality of metallic rings or plates operated by insulating sections, the entire drum of course being grooved so that the rider will travel continuously from one end of the drum to the other, and will make contact with one of the metallic rings or plates at the end of the first interval of time and will then continue to travel along the drum until the second metallic ring or plate is reached at the end of the second interval of time. It is to be understood, of course, that such metallic rings or plates should be connected to ground in order to effect the closing of the circuit, that includes the signaling device, when the rider comes in contact with the ring or plate. In the form of the invention shown in Fig. 2, the plate 14 is conductively connected to the shaft 8, which in turn is conductively connected to the supporting frame of the timing device which is grounded.

In addition to the types of circuits shown in Figs. 3 and 4, the invention may be used in connection with other types of circuits, such, for example, as the cord circuit employed with coin-collect telephones. In the latter type of circuit the timing device will light the associated lamp at the end of a five minute period, or other prefixed interval of time. If the call is still in progress, the operator will open the talk-key of that circuit and ask for the deposit of an additional coin. The detection of the deposit of the coin, and its collection, is evidenced by a tone in the operator's head set, in the usual manner. The timing device will be restored to its initial position in order to start again the timing of the next five minute period. At the conclusion of the call the trunk cord is removed which releases the relay such as $R_2$ associated with the timing device and resets that device for subsequent operation.

While this invention has been disclosed as embodied in a particular form and arrangement of parts, it is capable of embodiment in other and different forms without departing from the spirit and scope of the appended claims.

What is claimed is:

1. A device for timing the duration of a telephone call including a rotatable drum mounted upon a vertical axis and having thereon a spiral groove extending around the cylindrical wall of said drum from the top to the bottom thereof, the said drum having at the top thereof a layer electrically conductive and insulated from the remainder of the drum, means to rotate the drum at a uniform speed, a magnet, the armature of which has an extension member which is substantially vertical and parallel to the axis of the drum when the magnet is energized, and an electrically conductive rider rotatably and slidably mounted upon the said extension member and arranged to engage the groove upon the drum whenever the magnet is energized whereby it will be moved upward upon the said extension member by the rotation of the drum and will drop to the bottom of said member when the magnet is deenergized.

2. The invention of claim 1 characterized further in that the speed of rotation of the drum and the length of the groove are such that the rider will travel from the bottom of the drum to the electrically conductive layer at the top thereof in a pre-fixed interval of time.

3. A device for timing the duration of a telephone call including a drum having thereon a spiral groove extending around the cylindrical wall of the said drum from the top to the bottom thereof, the said drum having at the top thereof a layer electrically conductive and insulated from the remainder of the drum, means to rotate the drum at a uniform speed, a plurality of magnets, each of the armatures of which has an extension member which is substantially vertical and parallel to the axis of the drum when its corresponding magnet is energized, and a plurality of electrically conductive riders each individual to one of said armatures and rotatably mounted upon the extension member thereof to engage the groove upon the drum whenever the magnet is energized whereby the said rider will be moved upward upon the said extension by the rotation of the drum and will drop to the bottom of the said extension member when the magnet is deenergized.

4. A device for timing the duration of a telephone call including a rotatable cylindrical member having a spiral groove thereon, a portion of which member is electrically conductive and insulated from the remainder of the said member, an electrically conductive rider slidably mounted and adapted to engage the said member, the speed of rotation of which and the length of the groove path being such as to cause the said rider to travel into engagement with the conductive portion of the said member within a pre-fixed interval of time.

5. The invention defined by claim 4 further characterized by the inclusion of electromagnetic means to move the said rider into engagement with the said grooved member.

6. A device for timing the duration of a telephone call including a cylindrical drum a portion of which is electrically conductive and having a spiral groove formed in the curved wall thereof, a vertical shaft to which the said drum is rigidly attached, means to rotate the said shaft at the uniform speed, a slidable rider of electrically conductive material and adapted to engage the groove upon the said drum, a rod adapted to support the said rider and to permit its movement rotatably and longitudinally upon the said rod, a magnet having an armature associated therewith, the said armature rigidly supporting the said rod and arranged to swing the said rod inward and outward substantially in a plane passing through the axis of the shaft of the said drum.

7. A device for timing the duration of a telephone call including a rotatable cylindrical drum having a spiral groove upon the curved wall thereof and extending from one end of the drum to the other, the said groove terminating in a section of electrically conducting material which is insulated from the remainder of the said drum, an electrically conductive rider adapted to engage the groove of the drum near one end thereof, and to be carried by the rotation of the drum to the said section of electrically conducting material, a rod upon which the said rider is slidably supported and electromagnetic means to move the said rod to bring the said rider into engagement with the groove upon the said drum.

SANFORD FRANK DUNNING.

REFERENCES CITED

The following references are of record in the file of this patent:

UNITED STATES PATENTS

| Number | Name | Date |
|---|---|---|
| 1,554,340 | Gent | Sept. 22, 1925 |
| 2,029,667 | Maxwell | Feb. 4, 1936 |